United States Patent [19]

Najork

[11] 4,103,241

[45] Jul. 25, 1978

[54] RF AMPLIFIER AND ANTENNA

[75] Inventor: Jack Najork, Lexington, Nebr.

[73] Assignee: Reach Electronics, Inc., Lexington, Nebr.

[21] Appl. No.: 603,350

[22] Filed: Aug. 11, 1975

[51] Int. Cl.$^2$ .............................................. H04B 1/18
[52] U.S. Cl. ................................... 325/373; 325/374
[58] Field of Search ............... 325/365, 373, 374, 375, 325/380, 382, 383, 318–319; 343/846, 847, 848

[56] References Cited

U.S. PATENT DOCUMENTS

| 1,486,049 | 3/1924 | Spring .................................. | 325/365 |
| 1,843,018 | 1/1932 | Drake et al. ......................... | 325/375 |
| 2,787,704 | 4/1957 | Boelens et al. ...................... | 325/365 |
| 3,742,511 | 6/1973 | Smith et al. ......................... | 343/847 |

OTHER PUBLICATIONS

Radio–Electronics: Nov. 1958, pp. 48–51, "Two Multiband Transistor Sets," by Robert F. Scott.
International Dictionary of Physics & Electronics: Van Nostrand Company Inc., 1956, p. 190.

*Primary Examiner*—Benedict V. Safourek
*Attorney, Agent, or Firm*—Vogel, Dithmar, Stotland, Stratman & Levy

[57] ABSTRACT

The external antenna is coupled to the point of ground reference potential of the RF amplifier, which point is in turn connected to the ground reference of the receiver incorporating such amplifier.

3 Claims, 3 Drawing Figures

RF AMPLIFIER AND ANTENNA

BACKGROUND OF THE INVENTION

Radio frequency (RF) receivers have an antenna to pick up RF signals in the air and an RF amplifier having one or more stages, to amplify the RF signals. In order that the RF amplifier have high selectivity to RF signals of the particular frequency to which the receiver is designed to respond, it is provided with resonant circuits which are tuned to such frequency. Then, the receiver will only pick up those signals at such RF frequency and will ignore others. Usually the receiver is provided with an internal antenna, which, because of insufficient sensitivity, is supplemented by an external antenna. However, the simple connection of the external antenna to the receiver causes the resonant circuits in the RF amplifier to become detuned, so as to reduce the gain substantially. Even if the resonant circuits are tuned at the factory for optimum performance with the external antenna connected, the performance has been substantially less than that expected by adding an external antenna.

SUMMARY OF THE INVENTION

It is therefore an important object of the present invention to enable use of an external antenna without significant detuning of the resonant circuit RF amplifier.

In summary, there is provided in a receiver for RF signals, the combination comprising an RF amplifier for amplifying RF signals and having a point of ground reference potential, and antenna means adapted to receive RF signals and having an output on which such RF signals appear, the output being connected to such ground reference potential.

The invention consists of certain novel features and a combination of elements hereinafter fully described, illustrated in the attached drawings and claimed in the appended claims, it being understood that various changes in the details may be made without departing from the spirit or sacrificing any of the advantages of the invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages can be readily understood and appreciated.

DETAILED DESCRIPTION OF THE PREFERRED EMBODIMENT

Figure 1:
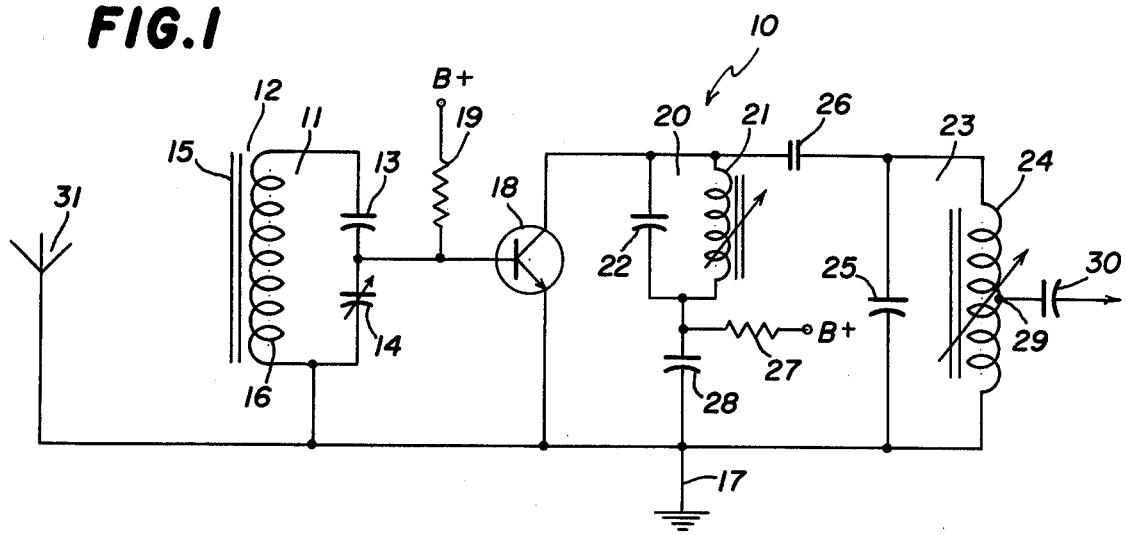
FIG. 1 is a schematic diagram depicting an RF amplifier and an external antenna incorporating the features of the present invention.

Turning now to FIG. 1, there is depicted an RF amplifier 10 of the kind found in a superheterodyne receiver, for example, which includes an input resonant circuit 11 having an inductor 12 and a pair of serially connected capacitors 13 and 14 thereacross. The inductor 12 includes a ferrite core 15 and a winding 16. One end of the winding 16 and one terminal of the capacitor 14 are connected together and to a point of ground reference potential 17. The capacitor 14 is variable and is adjusted so that the resonant circuit 11 is resonant at the frequency of the RF signal which the receiver is intended to receive. Such tuning may be performed by applying to the receiver an RF signal at such frequency, and then adjusting the capacitor 14 for a maximum response.

The junction of the capacitors 13 and 14 is coupled to the base of a PNP transistor 18. Bias for the transistor 18 is obtained by a resistor 19 coupled from the supply voltage to its base. The collector of the transistor 18 is coupled to an output resonant circuit having a slug-tuned inductor 21 and a capacitor 22. The resonant circuit 20 is tuned by adjusting the position of the slug in the inductor 21, to maximize the response to the desired RF frequency. A second resonant circuit 23 includes a slug-tuned inductor 24 and a capacitor 25 connected in parallel therewith. The resonant circuit 23 is coupled to the resonant circuit 20 by means of a capacitor 26. The resonant circuit 23 is tuned in the same way as the circuit 20. A DC supply voltage is coupled to the collector of the transistor 18 by means of a resistor 27, a capacitor 28 being provided for decoupling purposes. The inductor 24 has a tap 29 from which the RF output is taken and passed through a capacitor 30 to the next stage.

The inductor 12 actually is an antenna of the "loopstick" variety. However, such antenna usually does not have sufficient gain, and it is therefore desirable to use an external antenna in addition. The center lead of a coaxial cable connects a selected tap on the winding 16 to the signal terminal of the antenna, and the shielding of such cable is connected to the ground terminal of the antenna and to ground reference potential of the receiver. It is important that the tap be selected accurately so that the antenna impedance, which usually is 50 ohms, is properly matched to the RF amplifier impedance. However, in practice this is difficult to attain, and what normally occurs is that the connection of the antenna 31 detunes one or more of the resonant circuits 11, 20, and 23 with a corresponding degradation in receiver performance.

To overcome this, the signal terminal of the antenna 31 is connected directly to ground reference potential 17, as shown in FIG. 1. Such point of ground reference potential is in common with the ground reference potential of the rest of the receiver which incorporates the RF amplifier 10. In a vehicle, the shielding on the coaxial cable is directly connected to the vehicle chassis, in which case the ground reference potential on the receiver is floating. In a portable receiver, the shielding is not connected.

Figure 2:
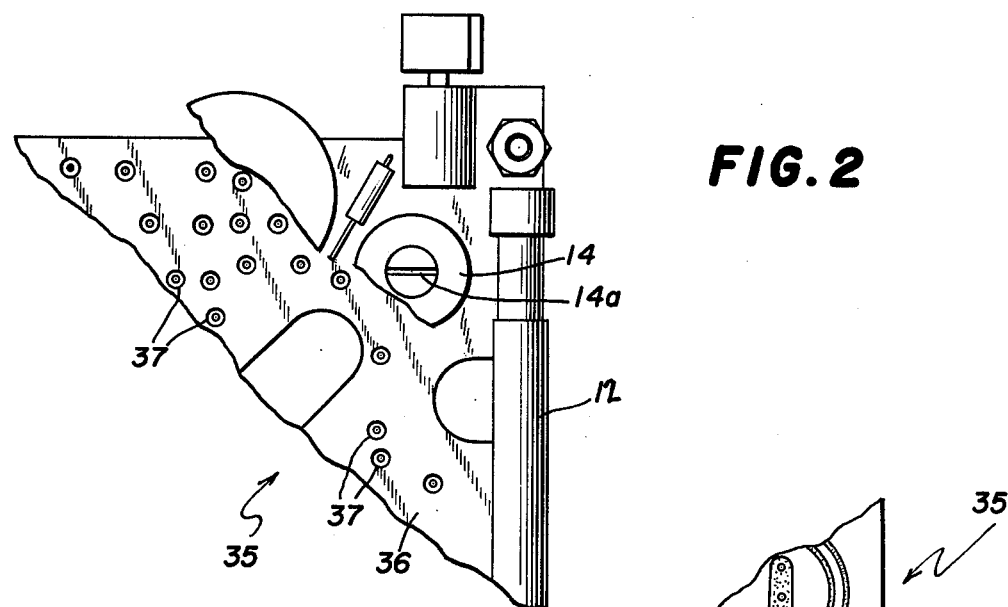
FIG. 2 is a fragmentary corner view of a printed circuit board on which the components of FIG. 1 are mounted, with some of the components being cut away to expose plating defining the ground plane.

Turning now to FIG. 2, there is depicted a corner of a printed circuit board assembly 35, on which is mounted the components of the receiver, including the components of the RF amplifier 10. Two of the components appear in FIG. 2, namely, the inductor 12 and the capacitor 14. A slot 14a is adapted to receive a screwdriver tip in order to enable adjustment of the capacitance furnished by the capacitor 14.

The assembly 35 includes an insulation board 38 (e.g., phenolic resin), one side of which is substantially covered by plating 36. A number of small, nonplated areas 37 surround the holes through which leads of the components pass. The plating 36 defines a ground reference plane to which the point of ground reference potential 17 is connected, along with the other points of ground reference potential throughout the receiver.

Figure 3:
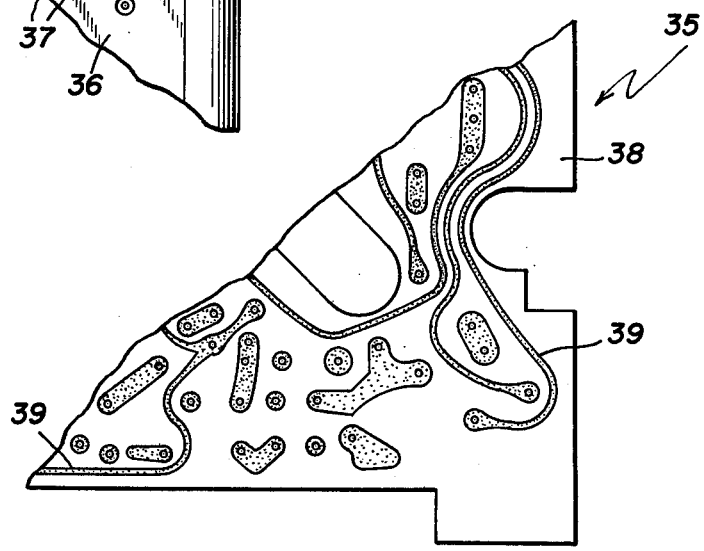
FIG. 3 is a view of the underside of the printed circuit board corner of FIG. 2.

FIG. 3 depicts the underside of the printed circuit board assembly 35, there being shown on the board 38 strips 39 of plating connecting the various components in the usual way.

The RF amplifier 10 is tuned in the manner described above. When the antenna 31 is thereafter connected to ground reference potential 17, it has virtually no effect on the tuning. There is no need to retune the receiver, with the attendant unlikelihood of achieving the optimum response that is expected.

When the receiver includes plating 36 constituting a ground plane, connection of the antenna 31 to ground reference potential yields a substantial improvement in performance over that when the antenna is connected to a tap on the winding 16. If the receiver has no ground plane, even connection of the antenna 31 to ground reference potential results in a noticeable improvement in performance over that when the antenna 31 is connected to a tap on the winding 16, but not as great as when a ground reference plane is provided.

It is believed that the invention, its mode of construction and assembly, and many of its advantages should be readily understood from the foregoing, without further description, and it should also be manifest that, while a preferred embodiment of the invention has been shown and described for illustrative purposes, the structural details are, nevertheless, capable of wide variation within the purview of the invention as defined by the appended claims.

What is claimed is:

1. In a receiver for RF signals, the combination comprising an RF amplifier for amplifying RF signals and having a point of ground reference potential, an internal antenna adapted to receive RF signals and having an output on which such RF signals appear, said output being coupled to said RF amplifier, and means defining an input for RF signals from an external antenna, said means being connected to said ground reference potential, said internal antenna being tunable and having been tuned while said input means is connected to said ground reference potential to maximize the sensitivity of said receiver.

2. In a receiver for RF signals and having a printed circuit board for the elements of the receiver, one side of the board having plating for selectively interconnecting the elements, and the other side having plating defining a ground reference plane for the elements, the combination comprising an RF amplifier for amplifying RF signals and having points of ground reference potential coupled to the ground reference plane, an internal antenna adapted to receive RF signals having an output on which such RF signals appear, said output being coupled to said RF amplifier, and means defining an input for RF signals from an external antenna, said means being connected to said ground reference potential, said internal antenna being tunable and having been tuned while said input means is connected to said ground reference potential to maximize the sensitivity of said receiver.

3. In a receiver for RF signals, the combination comprising an RF amplifier for amplifying RF signals and having a point of ground reference potential, an internal antenna adapted to receive RF signals and having an output on which such RF signals appear, said output being coupled to said RF amplifier, an external antenna for receiving RF signals and being connected to said ground reference potential, said internal antenna being tunable and having been tuned while said external antenna is connected to said ground reference potential to maximize the sensitivity of said receiver.

* * * * *